United States Patent [19]

Van Westerveld et al.

[11] 3,709,666
[45] Jan. 9, 1973

[54] PROCESS OF RECOVERING AMMONIUM SULPHATE FROM AN AQUEOUS SOLUTION CONTAINING AMMONIUM SULPHATE AND METHIONINE

[75] Inventors: Jan Van Westerveld, Geleen; Jozeph Marie Van Doorn, Sittard, both of Netherlands

[73] Assignee: Stamicarbon N.V., Heerlen, Netherlands

[22] Filed: Oct. 20, 1969

[21] Appl. No.: 867,885

[30] Foreign Application Priority Data

Oct. 19, 1968    Netherlands ........................6815005

[52] U.S. Cl. ..................23/300, 23/302, 23/119, 23/120, 260/534 S
[51] Int. Cl..............................B01d 9/02, C01c 1/24
[58] Field of Search........23/295, 300, 302, 119, 120; 260/534 S

[56] References Cited

UNITED STATES PATENTS

| | | |
|---|---|---|
| 3,597,168 | 8/1971 | Hoppe et al. ............................23/302 |
| 2,775,616 | 12/1956 | Holland ..............................260/534 S |
| 2,071,282 | 2/1937 | Glund.................................23/119 X |
| 2,162,655 | 6/1939 | Volkel................................23/300 X |
| 2,386,985 | 10/1945 | Shaw ..................................23/302 X |
| 2,443,391 | 6/1948 | Kirkpatrick .......................260/534 S |
| 2,471,053 | 5/1949 | Alinquist............................260/534 S |
| 2,482,830 | 9/1949 | Allen.................................23/300 X |
| 2,485,236 | 10/1949 | Greshain ............................260/534 S |
| 2,504,425 | 4/1950 | Kralovec ............................260/534 S |
| 2,659,659 | 11/1953 | Shmidl .....................................23/119 |
| 3,366,681 | 1/1968 | Thoma ...............................260/534 S |
| 3,408,157 | 10/1968 | Miller................................23/302 X |

OTHER PUBLICATIONS

Seidell, Solub. of Inor. and Org. Cds, Vol. 1, 1919, pages 63 to 66.

*Primary Examiner*—Wilbur L. Bascomb, Jr.
*Assistant Examiner*—S. J. Emery
*Attorney*—Cushman, Darby & Cushman

[57] ABSTRACT

A process for recovering ammonium sulfate from an aqueous solution containing ammonium sulfate and methionine by precipitating ammonium sulfate with a monovalent aliphatic alcohol.

4 Claims, No Drawings

PROCESS OF RECOVERING AMMONIUM SULPHATE FROM AN AQUEOUS SOLUTION CONTAINING AMMONIUM SULPHATE AND METHIONINE

The present invention relates to a process of recovering ammonium sulfate from an aqueous solution containing ammonium sulfate and methionine. In the preparation of methionine by hydrolysis of γ-methyl-mercapto-α-amino-butyronitrile with sulfuric acid wherein the resulting hydrolysis mixtured is neutralized by means of ammonia an aqueous solution containing ammonium sulfate and methionine is produced. Therefore, various methods have been proposed for recovering the ammonium sulfate and the methionine values from such a solution.

According to one well-known method ammonium sulfate is precipitated from an aqueous solution containing ammonium sulfate and an amino acid by adding ammonia to the solution. After removal of the precipitated ammonium sulfate a portion of the amino acid can be recovered from the remaining solution by crystallization. When the amino acid is methionine, this process must be carried out at elevated pressure in order to insure that sufficient ammonia is dissolved in the aqueous solution. The utilization of high pressures, however, renders this particular process commercially unattractive because, for instance, of the need for expensive high pressure equipment. Moreover in the processing of the ammonium sulfate suspension significant amounts of ammonia are lost. In another known process a solution containing methionine and ammonium sulfate is evaporated to dryness at reduced pressure. The remaining residue is extracted several times with liquid ammonia. In this extraction the methionine dissolves in the liquid ammonia, after which it can be recovered from the resulting solution by evaporation of the ammonia, the ammonium sulfate being left as a solid residue. Again because of the high cost of equipment and power this method is unattractive for large-scale application.

According to still another well-known method, an aqueous solution containing ammonium sulfate and methionine is subjected to a liquid-liquid extraction with ethanol, which provides (1) an ethanol-rich fraction which contains the major portion of the methionine dissolved therein and (2) an aqueous fraction rich in ammonium sulfate and containing some ethanol and only a minor amount of methionine. Although in comparison with the other known methods described above, this latter method has been recognized as a decided improvement in the processing of these aqueous solutions containing methionine and ammonium sulfate, it has the drawback of being practicable only under conditions rendering possible the formation of a system consisting of two liquid layers. In addition, the liquid-liquid extraction becomes less attractive as the ratio of methionine to ammonium sulfate in the feed solution increases. Further, to recover sufficient amounts of ethanol for recycle or reuse in this system, two distillation operations are required, one on the ethanol-rich fraction and one on the aqueous fraction rich in ammonium sulfate.

It has now been found that the disadvantages of prior art methods can be overcome by the present invention which comprises adding a monohydroxy alkanol having one to five carbon atoms to an aqueous solution containing ammonium sulfate and methionine thereby precipitating the ammonium sulfate and separating the precipitated ammonium sulfate. After the precipitated ammonium sulfate has been separated the alcohol can be recovered by distilling the remaining mother liquor. The concentration of the recovered alcohol is such that it can be used again for precipitating ammonium sulfate. Representative monohydroxy alkanols suitable for use in the present invention include methanol, ethanol, propanol, isopropanol, secondary and tertiary butanol, tertiary pentanol and their mixtures. Preferably, the alcohol used is methanol, ethanol or isopropanol. These alcohols and their mixtures are characterized in that they can be recovered by distillation from the mother liquor in a concentration of at least 70 percent by weight.

The amount of monohydroxy alkanol added to the aqueous solution containing ammonium sulfate and methionine is preferably taken between 35 and 90 weight percent based on the total weight of the mixture. The amount of ammonium sulfate present in the aqueous solution to be treated in accordance with the present invention ranges between 5 to 50 weight percent of the solution while methionine is present therein in amounts ranging between 0.2 to 7 weight percent.

As compared with the liquid-liquid extraction with ethanol, it has been found that when the present process is carried out using, as the alkanol, ethanol, optimum results can be obtained if, after the precipitation of the ammonium sulfate and its separation from the mother liquor, the ethanol is recovered by distillation from the mother liquor in a concentration of between 85 and 95 percent. When using methanol, optimum results can be obtained if the methanol is recovered in a concentration of more than 90 percent.

The precipitation of the ammonium sulfate according to the invention can be effected over a wide range of temperatures. It has been found, for instance, that at elevated temperatures, other conditions being the same, a greater amount of alcohol is required to precipitate an equivalent amount of ammonium sulfate, although the methionine content present in the ammonium sulfate precipitated at the higher temperature is lower. In practice, temperatures of 20°–75° C prove most suited for the precipitation of the ammonium sulfate.

Furthermore, the process according to the invention can be carried out at various pressures. However, for reasons of economy, atmospheric pressures are preferred.

The recovery of ammonium sulfate, according to the invention, can be combined in various ways with the preparation of methionine, if in its preparation process the methionine is obtained in the form of an aqueous solution containing methionine and ammonium sulfate. For instance, after the production of this solution, methionine values can be removed initially from the solution by conventional crystallization techniques. Thereafter, ammonium sulfate can be recovered from the remaining solution by the process of the invention and then the remaining solution can be returned to the methionine crystallization stage. As an alternative, after the production of the aqueous solution containing ammonium sulfate and methionine, the ammonium sulfate can initially be recovered therefrom by the process of the invention. Thereafter the remaining solution can be subjected to conventional crystallization techniques to crystallize the methionine therefrom. The finally resulting solution can then be recycled to the ammonium sulfate separation stage.

The invention will be elucidated in the following examples, without it being restricted thereto.

EXAMPLE I

At 30° C, 150 g of methanol (strength, 95 percent by weight) is added slowly, and with stirring, to 100 g of an aqueous solution containing 19.8 percent by weight of ammonium sulfate and 2.0 percent by weight of methionine.

The ammonium sulfate which precipitates during this operation is recovered by filtration and washed with 20 g of methanol (strength, 95 percent by weight).

After drying, 16.4 g of a solid substance is obtained, which has an ammonium sulfate content of 99.8 percent by weight and a methionine content of 0.08 percent by weight. Of the ammonium sulfate present in the original aqueous solution 83 percent is thus recovered.

The mixture of mother liquor and the washing liquid are distilled at atmospheric pressure. At a temperature between 64° and 66° C 160.3 g of methanol with a water content of 2.1 percent by weight distills off as overhead product. The bottom product remaining upon distillation can be returned to the stage of the methionine preparation in which methionine is recovered by crystallization.

EXAMPLE II

At 20° C, 100 g of methanol (strength, 98 percent by weight) is added slowly, with stirring, to 100 g of an aqueous solution containing 41.4 percent by weight of ammonium sulfate and 0.4 percent by weight of methionine.

The ammonium sulfate which precipitates during this operation is removed by filtration and washed with 40 g of methanol. After drying, 38.6 g of ammonium sulfate (93 percent of the original amount) is obtained, with 0.07 percent by weight of methionine contained in it.

The mixture of mother liquor and washing liquid are distilled to recover methanol as overhead product and to recover 63.2 g of bottom product containing 3.6 percent by weight of ammonium sulfate and 0.6 percent by weight of methionine.

EXAMPLE III

At 60° C, 200 g of methanol (strength, 98 percent by weight) is added slowly, with stirring, to 100 g of an aqueous solution containing 9.7 percent by weight of ammonium sulfate and 3.9 percent by weight of methionine. The precipitated ammonium sulfate is then removed by filtration at 60° C.

After washing and drying in essentially the same manner outlined in Example I, 5.3 g of ammonium sulfate (55 percent of the original amount), having a methionine content of 0.11 percent by weight are recovered.

Methanol is recovered from a mixture of the mother liquor and washing liquid by distillation as overhead product. 93 g of an aqueous bottom product is also produced by this distillation, the bottom product containing 4.4 percent by weight of ammonium sulfate and 4.0 percent by weight of methionine, the latter being recovered therefrom by crystallization.

EXAMPLE IV

At 40° C, 150 g of methanol (strength, 90 percent by weight) is added slowly, with stirring, to 100 g of an aqueous solution containing 44.2 percent by weight of ammonium sulfate and 0.5 percent by weight of methionine.

The precipitated ammonium sulfate is recovered by filtration at about 40° C.

After washing the filtered ammonium sulfate with ethanol and drying, 41.6 g of ammonium sulfate (94 percent of the original amount) is obtained, which has a methionine content of 0.09 percent by weight.

Ethanol is recovered by distilling the mixture of mother liquor and washing liquid, 61.4 g of an aqueous bottom product is also produced which contains 3.4 percent by weight of ammonium sulfate and 0.8 percent by weight of methionine.

EXAMPLE V

At 20° C, 300 g of isopropanol (strength, 85 percent by weight) is added slowly, with stirring, to 100 g of an aqueous solution containing 24.3 percent by weight of ammonium sulfate and 1.2 percent by weight of methionine. The precipitated ammonium sulfate is recovered by filtration and washed with isopropanol.

After drying, 20.7 g of ammonium sulfate (85 percent of the original amount) is obtained, which has a methionine content of 0.18 percent by weight.

By distillation 316 g of isopropanol (strength 85 percent by weight) is recovered from mother liquor and washing liquid.

EXAMPLE VI

At 75° C, 315 g of ethanol (strength 90 percent by weight) is added slowly, with stirring, to 100 g of an aqueous solution containing 22 percent by weight of ammonium sulfate and 4.9 percent by weight of methionine. The precipitated ammonium sulfate is removed by filtering while hot. After washing with 20 g of ethanol (strength, 90 percent by weight) and drying, 19.3 g of ammonium sulfate (88 percent of the original amount) is obtained, which has a methionine content of 0.09 percent by weight. From mother liquor and washing liquid 326.5 g of ethanol (strength, 91 percent by weight) is recovered by distillation. Thereafter, 46 g of water is removed from the remaining bottom product by evaporation, and the concentrated solution now resulting is cooled to 25° C, with crystallization of methionine. The crystallized methionine is recovered by filtration and dried.

The yield is 3.5 g of methionine with an ammonium sulfate content of 0.9 percent by weight. The mother liquor left after this last crystallization can be used in the precipitation of another amount of ammonium sulfate, after having been subjected to evaporation.

What is claimed is:

1. A process for recovering ammonium sulfate from an aqueous solution containing 5 – 50 weight percent ammonium sulfate and 0.2 – 7 weight percent methionine comprising (1) adding to said aqueous solution a mono-hydroxy alkanol having one to five carbon atoms in amounts of about 49 – 90 percent by weight of the resulting mixture, at a temperature of 20°–75C thereby precipitating said ammonium sulfate, (2) separating the precipitated ammonium sulfate therefrom, (3) distilling the remainder to recover said monohydroxy alkanol and (4) recycling said monohydroxy alkanol from step (3) to step (1).

2. The process of claim 1 wherein the alkanol is slected from the group consisting of methanol, ethanol and isopropanol.

3. The process of claim 1 wherein the monohydroxy alkanol recovered is ethanol having a concentration of 85–95 weight percent.

4. The process of claim 1 wherein the monohydroxy alkanol is methanol having a concentration of at least 90 weight percent.

* * * * *